United States Patent
Swan et al.

(10) Patent No.: US 10,095,828 B2
(45) Date of Patent: Oct. 9, 2018

(54) PRODUCTION LOGS FROM DISTRIBUTED ACOUSTIC SENSORS

(71) Applicant: CONOCOPHILLIPS COMPANY, Houston, TX (US)

(72) Inventors: Herbert W. Swan, Houston, TX (US); Ge Jin, Houston, TX (US); Kyle R. Krueger, Houston, TX (US); Baishali Roy, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 15/453,730

(22) Filed: Mar. 8, 2017

(65) Prior Publication Data
US 2018/0045040 A1    Feb. 15, 2018

Related U.S. Application Data

(60) Provisional application No. 62/305,758, filed on Mar. 9, 2016, provisional application No. 62/305,777, filed on Mar. 9, 2016.

(51) Int. Cl.
*G06F 19/00* (2018.01)
*E21B 47/02* (2006.01)

(52) U.S. Cl.
CPC .............. *G06F 19/00* (2013.01); *E21B 47/02* (2013.01)

(58) Field of Classification Search
CPC ...... E21B 47/02; E21B 47/065; E21B 47/101; E21B 47/123; G01F 1/66; G06F 19/00
See application file for complete search history.

(56) References Cited

U.S. PATENT DOCUMENTS

| | | | |
|---|---|---|---|
| 3,981,187 A * | 9/1976 | Howell | E21B 47/065 374/136 |
| 4,676,664 A * | 6/1987 | Anderson | E21B 47/065 374/136 |
| 6,778,720 B1 | 8/2004 | Cekorich et al. | |
| 8,950,482 B2 | 2/2015 | Hill et al. | |
| 2006/0272809 A1 | 12/2006 | Tubel et al. | |
| 2009/0114386 A1 | 5/2009 | Hartog et al. | |
| 2013/0233537 A1 | 9/2013 | McEwen-King et al. | |
| 2013/0298635 A1 | 11/2013 | Godfrey | |
| 2013/0298665 A1 | 11/2013 | Minchau | |

(Continued)

FOREIGN PATENT DOCUMENTS

WO    WO 2013/092906 A2 *  6/2013  ............. G01F 1/688

OTHER PUBLICATIONS

Boman, K.,—"DAS Technology Expands Fiber Optic Applications for Oil, Gas Industry", 2015, Rigzone, Energy News Article, May 4, 2015 issue, http://www.rigzone.com/news/oil_gas/a/138405/DAS_Technology_Expands_Fiber Optic_Applications_for Oil_ Gas_ Industry; 4 pgs.

(Continued)

*Primary Examiner* — Orlando Bousono
(74) *Attorney, Agent, or Firm* — Conocophillips Company

(57) ABSTRACT

A system and method for monitoring oil flow rates along a producing oil or gas well using a Distributed Acoustic Sensing fiber is described. This system uses the low-frequency component of the acoustic signal as a measurement of temperature variations within the well. The relative flow contributions can then be inferred from these temperature fluctuations.

15 Claims, 4 Drawing Sheets

(56) References Cited

U.S. PATENT DOCUMENTS

| | | |
|---|---|---|
| 2014/0202240 A1 | 7/2014 | Skinner et al. |
| 2014/0216151 A1 | 8/2014 | Godfrey et al. |
| 2014/0260588 A1 | 9/2014 | Jaaskelainen et al. |
| 2014/0358444 A1 | 12/2014 | Friehauf et al. |
| 2014/0365130 A1* | 12/2014 | Woods .................. G01F 1/6884 702/12 |
| 2016/0003032 A1 | 1/2016 | Grubb et al. |
| 2016/0146962 A1* | 5/2016 | Hayward ................ E21B 43/26 166/250.1 |

OTHER PUBLICATIONS

Webster, P., et al—"Developments in Diagnostic Tools for Hydraulic Fracture Geometry Analysis", 2013, Unconventional Resources Technology Conferene (URTeC), Denver, Colorado, Aug. 12-14, 2013, SPE 168933/URTec 1619968, pp. 1-7; 7 pgs.

Optasense, "Pipeline Integrity Management: Leak Detection", 2013 brochure, www.optasense.com; 5 pgs.

Paleja, Rakesh, et al—"Velocity Tracking for Flow Monitoring and Production Profiling Using Distributed Acoustic Sensing", 2015, Society of Petroleum Engineers, SPE-174823-MS, Presented at the SPE Annual Technical Conference and Exhibition held in Houston, TX USA Sep. 28-30, 2015, pp. 1-16; 16 pgs.

Boone, K., et al—"Monitoring Hydraulic Fracturing Operations Using Fiber-Optic Distributed Acoustic Sensing", 2015, Unconventional Resources Technology Conference, SPE-178648-MS/URTeC:2158449, Presented at the Unconventional Resources Technology Conference held in San Antonio, TX, USA Jul. 20-22, 2015, pp. 1-8; 8 pgs.

* cited by examiner

PRODUCTION LOGS FROM DISTRIBUTED ACOUSTIC SENSORS

CROSS-REFERENCE TO RELATED APPLICATIONS

This application is a non-provisional application which claims benefit under 35 USC § 119(e) to U.S. Provisional Application Ser. No. 62/305,758 filed Mar. 9, 2016, entitled "LOW FREQUENCY DISTRIBUTED ACOUSTIC SENSING," and Ser. No. 62/305,777 filed Mar. 9, 2016, entitled "PRODUCTION LOGS FROM DISTRIBUTED ACOUSTIC SENSORS," each of which is incorporated herein in its entirety.

STATEMENT REGARDING FEDERALLY SPONSORED RESEARCH

None.

FIELD OF THE INVENTION

The present invention relates generally to the use of distributed fiber optic sensing including Distributed Acoustic Sensing (DAS) and Distributed Temperature Sensing (DTS) in subterranean wellbores for hydrocarbon production. In particular this application is directed to detailed production logging utilizing low frequency monitoring of DAS signals by measuring fluid flow through an oil or gas well, which has been instrumented with an optical fiber.

BACKGROUND OF THE INVENTION

Fiber-optic cables can be installed in vertical and horizontal wells, which can be treatment wells, injector wells or observation wells. Within the cable there are often both single mode fibers for DAS and multi-mode fibers for DTS. Multiple fibers within one cable can offer redundancy and the ability to interrogate with different instrumentation simultaneously.

DAS is the measure of Rayleigh scatter distributed along the fiber optic cable. A coherent laser pulse is sent along the optic fiber, and scattering sites within the fiber cause the fiber to act as a distributed interferometer with a gauge length approximately equal to the pulse length. The intensity of the reflected light is measured as a function of time after transmission of the laser pulse. When the pulse has had time to travel the full length of the fiber and back, the next laser pulse can be sent along the fiber. Changes in the reflected intensity of successive pulses from the same region of fiber are caused by changes in the optical path length of that section of fiber. This type of system is very sensitive to both strain and temperature variations of the fiber and measurements can be made almost simultaneously at all sections of the fiber.

Raw DAS data are usually in the form of optical phase, with a range from −pi to +pi. The optical phase is defined by the interference pattern of the back-scattered laser energy at two locations separated by a certain length (gauge length) along the fiber. The phase varies linearly with a small length change between these two locations, which can be interpreted as axial strain change of the fiber in between. Depending on the vender, the measured optical phase is sometimes differentiated in time before it is stored. In this case, the DAS data can be considered as linear scaled fiber strain rates.

Prior to fiber optics, methods relied on acoustic stimuli (Godfrey, 2013), Doppler shifts (Godfrey and Crickmore, 2014), pressure pulses (Skinner et al., 2014) or spinners (Jaaskelainen et al., 2013), DAS has been used to monitor hydraulic fracturing operation. The applications include injection fluid allocation (e.g. Broone et al. 2015), hydraulic fracture detection (e.g. Webster et al. 2013), and production allocation (e.g. Paleja et al. 2015). However, these applications focus on the DAS signals that are in high frequency bands (>1 Hz), and some applications only use the "intensity" of the signal (waterfall plot), which is obtained through a RMS averaging operation.

DAS has been used extensively to measure strain in hydrocarbon wells. Hill, et al., (U.S. Pat. No. 8,950,482) monitor hydraulic fracturing during oil/gas well formation. Tubel, et al., (US20060272809) control production operations using fiber optic devices. Hartog, et al., (US20090114386) use an optical fiber as a distributed interferometer that may be used to monitor the conduit, wellbore or reservoir. Minchau (US20130298665) provides an in-situ permanent method for measuring formation strain in a volume around a treatment well. McEwen-King (US20130233537) acoustic data from distributed acoustic sensing is processed together with flow properties data to provide an indication of at least one fracture characteristic. This is in no way an all-encompassing review of the technology. A recent review was published by Webster (2013) and the field has continued to advance rapidly.

Unfortunately, a common problem in optimizing the performance of horizontal wells stimulated via hydraulic fracturing is determining the relative amounts each fracture stage is contributing to the total oil production. Without this information, it is difficult to assess the effectiveness of various well treatment strategies during completion, or after production has commenced.

BRIEF SUMMARY OF THE DISCLOSURE

In order to obtain the best resolution and identify repeatable and quantifiable signals, a ultra low-frequency band from 0-50 milliHz (mHz) of the DAS raw data (phase data) has been isolated that contains critical information to evaluate the efficiency of hydraulic fracturing operations.

In one embodiment, oil flow rates along a hydrocarbon reservoir are monitored:
 a) installing one or more fiber optic cables along a wellbore in a hydrocarbon formation;
 b) installing one or more interrogators on at least one fiber optic cable;
 c) interrogating at least one fiber optic cable with an interrogation signal during production using an interrogator;
 d) obtaining one or more datasets from said interrogator;
 e) converting one or more datasets from the interrogator into a continuous record;
 f) transforming said continuous record with a low-pass filter to 1-100 milliHz while down sampling the data;
 g) approximating flow velocities by calculating the slope of constant temperature variation as a function of depth; and
 h) estimating the distributed production rate of hydrocarbons from said hydrocarbon formation.

In another embodiment, oil flow rates along a hydrocarbon reservoir are monitored by:
 a) installing one or more fiber optic cables along a wellbore in a hydrocarbon formation;

b) installing one or more interrogators on at least one fiber optic cable;
c) choke back/shut-in the well and then reopen it to create temperature perturbation (slug) in the well, the shut-in/opening operation can be performed multiple times.
d) interrogating at least one fiber optic cable with an interrogation signal during the well operation;
e) obtaining one or more datasets from an interrogator;
f) converting one or more datasets from said interrogator into a continuous record;
g) transforming the continuous record with a low-pass filter to 1-100 milliHz while down sampling the data;
h) removing the thermal coupling effect between the borehole and sensing fiber cable from the DAS data;
i) computing a semblance function for the corrected DAS signal during the well opening event after shut-in/choke back;
j) quantitatively estimate a flow velocity profile by maximizing semblance function for one or multiple well opening events.
k) determining the distributed production rate of hydrocarbons from said hydrocarbon formation.

In an additional embodiment, oil flow rates along a hydrocarbon reservoir are monitored by:
a) installing one or more fiber optic cables along a wellbore in a hydrocarbon formation;
b) installing one or more interrogators on at least one fiber optic cable;
c) interrogating at least one fiber optic cable with an interrogation signal during production using an interrogator;
d) obtaining one or more datasets from the interrogator;
e) converting one or more datasets from the interrogator into a continuous record;
f) transforming the continuous record with a low-pass filter to 1-100 milliHz while down sampling the data into a transformed well signal;
g) quantitatively measuring flow velocities comprising:
   i) use and initial estimate of fluid velocity to compute a traveltime function f(x),
   ii) numerically form an inverse function through piecewise interpolation,
   iii) form a series of traveltime functions and their inverses,
   iv) compute the semblance over a range of $\delta\tau$,
   v) set a new traveltime function f(x) at $g(x,\delta\tau)$, and
   vi) repeat (i)-(v) until convergence is achieved; and
h) determining the distributed production rate of hydrocarbons from said hydrocarbon formation.

In an additional embodiment, oil flow rates along a hydrocarbon reservoir are monitored by:
a) installing one or more fiber optic cables along a wellbore in a hydrocarbon formation;
b) installing one or more interrogators on at least one fiber optic cable;
c) varying the well production rate to create temperature perturbation (slug) in the well, which can be performed multiple times.
d) interrogating at least one fiber optic cable with an interrogation signal during the well operation;
e) obtaining one or more datasets from the interrogator;
f) converting one or more datasets from the interrogator into a continuous record;
g) transforming the continuous record with a low-pass filter to 1-100 milliHz while down sampling the data;
h) converting low-frequency DAS data into temperature variation;
i) using Equation 23 to model to borehole temperature variation; and
j) determining the distributed production rate of hydrocarbons from said hydrocarbon formation by minimizing the misfit between the model result and the observed temperature variation.

The determining step may be performed by a program stored in a computer.

Data may be displayed in a 2D, 3D, or 4D (over time) format including computer displays or maps. A paper or plastic printouts or a 3D display of the recorded or processed signals may be used. Printing, displaying or saving results and production rates to a non-transitory machine-readable storage medium the recorded or processed signals (or both). A non-transitory machine-readable storage medium may be used to save the recorded or processed signals (or both). A non-transitory machine-readable storage medium, which when executed by at least one processor of a computer, may perform the determining step.

Fiber optic cables may consist of temporarily installed fiber optic cables, permanently installed fiber optic cables, and combinations thereof.

Any method described herein, including the further step of printing, displaying or saving the results of the workflow.

Any method described herein, further including the step of using said results in a reservoir modeling program to predict reservoir performance characteristics, such as fracturing, production rates, total production levels, rock failures, faults, wellbore failure, and the like.

Any method described herein, further including the step of using said results to design and implement a hydraulic fracturing program, any enhanced oil recovery program, or a production plan.

A non-transitory machine-readable storage medium, which when executed by at least one processor of a computer, performs the steps of the method(s) described herein.

Hardware for implementing the inventive methods may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system. Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors. Slower systems could also be used, because the processing is less compute intensive than for example, 3D seismic processing.

This summary is provided to introduce a selection of concepts that are further described below in the detailed description. This summary is not intended to identify key or essential features of the claimed subject matter, nor is it intended to be used as an aid in limiting the scope of the claimed subject matter.

"Interferences" is used broadly herein to denote anything that affects the signal of the DAS measurements. This can include vibration, surface noise, seismic noise sources, drifts, and other signal interference mechanisms.

As used herein, the term "interrogator" refers to an electronic device that transmits a signal, in this case a laser pulse through a fiber optic cable, to obtain a response (i.e. Rayleigh Scattering) that is typically recorded. Measurements of background noise are usually taken to determine baseline for the signal and can be subtracted out for improved signal intensity.

Any interrogator can be used to collect the LF-DAS data, In some cases two or more interrogators may be used in parallel, one to collect "noise"/high-frequency DAS and a second interrogator to collect temperature rate of change/low-frequency DAS.

As used herein, the term "inwell" refers to measuring DAS data in the well of interest.

As used herein, the term "crosswell" refers to measuring DAS data in a monitoring well, and imputing the data to the well of interest.

As used herein, the term "semblance analysis" or "semblance function" refers to a process used in the refinement and study of seismic data to greatly increase the resolution of the data despite the presence of background noise.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
|---|---|
| DAS | Distributed Acoustic Sensing |
| DTS | Distributed Temperature Sensing |
| AGC | automatic gain control |
| LF-DAS | Low Frequency-DAS |

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Figure 1:
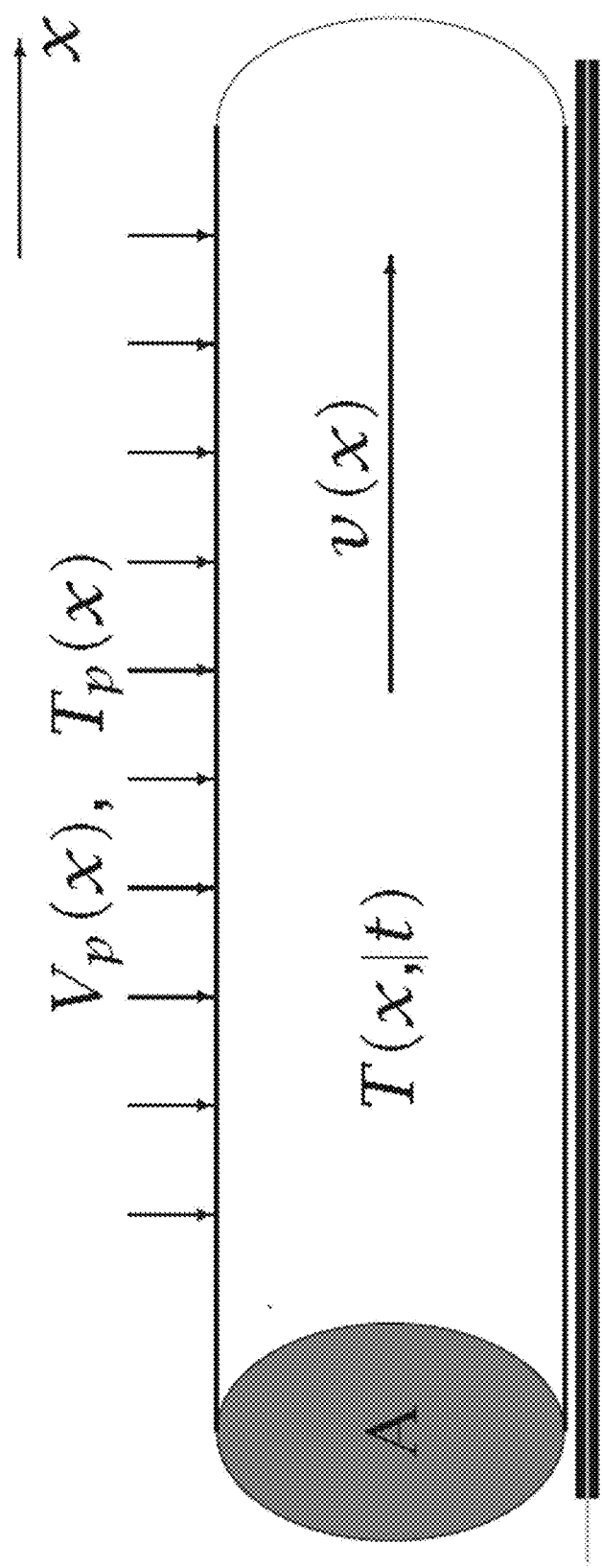
FIG. 1 illustrates a buried horizontal oil well during production.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Previously, Friehauf and Dean (US-2014-0358444, 2014) identify fractures in a formation having a wellbore including: (a) positioning a sensor within the wellbore, wherein the sensor generates a feedback signal representing at least one of a temperature and pressure measured by the sensor; (b) injecting a fluid into the wellbore and into at least a portion of the formation adjacent the sensor; (c) waiting a predetermined period of time; (d) generating a standstill simulated model representing at least one simulated temperature characteristic and at least one pressure characteristic of the formation during and after fluid injection; (e) shutting-in the wellbore for a pre-determined shut-in period; (f) generating a shut-in simulated model representing at least one simulated temperature characteristic and at least one pressure characteristic of the formation during the shut-in period; (g) generating a data model representing the standstill simulated model and the shut-in simulated model, wherein the data model is derived from the feedback signal; and (h) observing the data model for presence of fractures within the wellbore, wherein fractures are present when the temperature characteristics are lower than the temperature characteristics of other sections of the wellbore.

Additionally, Grubb and Friehauf (US-2016-0003032, 2016) provide a logging tools to determine temperature of produced fluid flowing into or within a wellbore including: a core structure; an arm extendibly and pivotally mounted to the core structure, the arm is extended away from the core structure and is near the inner surface of the wellbore, wherein the arm pivots in one plane relative to the core structure; a data transfer device connected to the core structure for receiving, processing and storing data; and at least one temperature sensors attached to the arm, wherein the temperature sensor is located at a tip of the arm, wherein when the arm is extended away from the core structure the temperature sensor is at or near the inner surface of the wellbore.

Unlike prior methods, this method uses transient temperature changes that occur after total production from a well is halted (shut in) for a period of time, but then is resumed at a steady rate. During the shut-in period, small differences in formation temperature permeate into the well bore through thermal conduction. When production resumes, the fluid flow within the well causes a measurable wave of temperature fluctuations to move in the direction of the flow. Flow rates along the well can be inferred from these temperature changes, and variations in rates provides an indication of the relative productivity of the well intervals.

Scattered light pulses from nearby segments of the fiber are combined in an interferometer. The phase differences between the pulses is then a measure of their relative separations of their origins. A change in separation as small as one one-hundredth of a wavelength can easily and accurately be measured. This typically amounts to a 10-7 percentage change in fiber length (strain). Although DAS was originally designed to record fiber strains due to acoustic waves of frequencies up to 10 kHz, its response also extends to very low frequencies (<0.01 Hz). It is these low-end frequency components in the DAS response that are caused by the thermal expansion from localized temperature variations that this invention utilizes.

Data Acquisition

DAS signal is recorded in the stimulated well (in-well) as well as in the offset wells (cross-well) during the completion and production stages. The distances between the stimulated well and offset monitor wells range from 50 ft to 1200 ft. The fiber-optic cables are installed out of the casing and cemented in place. Numerous interrogators are available to record optical signals. In one embodiment, Pinnacle Gen-1 and Phase-1 interrogators are used for the recording. The raw data are sampled at 10 kHz continuously at more than 6000 locations (referred as "channels" in this study) with 1 m spatial separation along the fiber. The gauge length is set to 5 m. When recording, the measured optical phase is differentiated in time, so the raw DAS data is linearly associated with strain rate along the fiber.

Data Processing

The data are down-sampled to 1 s after the anti-aliasing filter (0-0.5 Hz) is applied. It is then median filtered to remove the spiky noise. Then a low-pass filter with a corner frequency of 0.05 Hz is applied. At this stage, a DC component with an amplitude around 0.1 rad/s can be detected in the signal. The DC value is stable and does not vary significantly with operations, and is probably associated with the interrogator noises. For the cross-well applications, we determine the DC value by taking the median value of the channels that are out of range of interested signal at each time interval, and subtract it from the data. For the in-well measurements, as the signal strength is much higher and the interested signal covers the whole fiber, this DC value is ignored.

A comparison between the conventional waterfall plot and the processed low-frequency signal is shown in FIG. 1. The low-frequency processing not only increases the signal-to-noise ratio of the cross-well signal, but also recovers the polarity of the strain rate, which is critical for later interpretation. The strain change recorded by DAS at this frequency band can be caused by thermal extension/contraction or by mechanic strain change in the formation. The interpretation of these signals is discussed in the next section.

The following examples of certain embodiments of the invention are given. Each example is provided by way of explanation of the invention, one of many embodiments of the invention, and the following examples should not be read to limit, or define, the scope of the invention.

Example 1

FIG. 1 illustrates a buried horizontal oil well during production. The well has a cross-sectional area of A, and is closed off at its toe-end. The other end eventually reaches the surface, where a throttling valve controls the total production from the well. This total production is denoted by P(t), which is a function of time, t. As shown in FIG. 1, a horizontal section of a well with an attached tube containing an optical fiber, and production perforation points indicated by vertical arrows. The fluid flow vector v(x) points in the positive x-axis.

An optical fiber encased in a gel-filled metallic tube is either fastened to the outside of the well casing (as shown) or inserted within it, so that it is in close thermal contact with the fluids inside the well. This fiber is connected to a DAS interrogation unit, such as is described by Cekorich and Bush (2004). This unit measures small expansions and contractions of the fiber by sending laser pulses down the fiber and recording the phase differences between the light pulses that return to the interrogator due to Rayleigh scattering. Although these expansions and contractions are typically sampled thousands of times per second, it is the ultra low-frequency components, <100 mHz, of these fluctuations that are relevant here. These may be obtained from the recorded DAS signal via low-pass digital filtering. These low-frequency components of fiber expansion and contraction are linearly proportional to the time rate of change of the fiber temperature Reservoir fluids enter the well casing at various perforation points, shown as vertical arrows in FIG. 1. The fluids enter at a volume rate per unit pipe length, Vp, which is a function of lateral position x. This rate is assumed to be approximately constant during the period of time over which the DAS data is recorded. The production fluids which fill the fractures have an unknown temperature of Tp. Since these fluids have a relatively high specific heat, and they are embedded in a reservoir rock that has a low thermal conductivity, their temperatures can be reasonably assumed to have a constant temperature during the course of the production rate measurement. Consequently, both Tp and Vp are functions only of lateral position x, and not of time.

Figure 2:
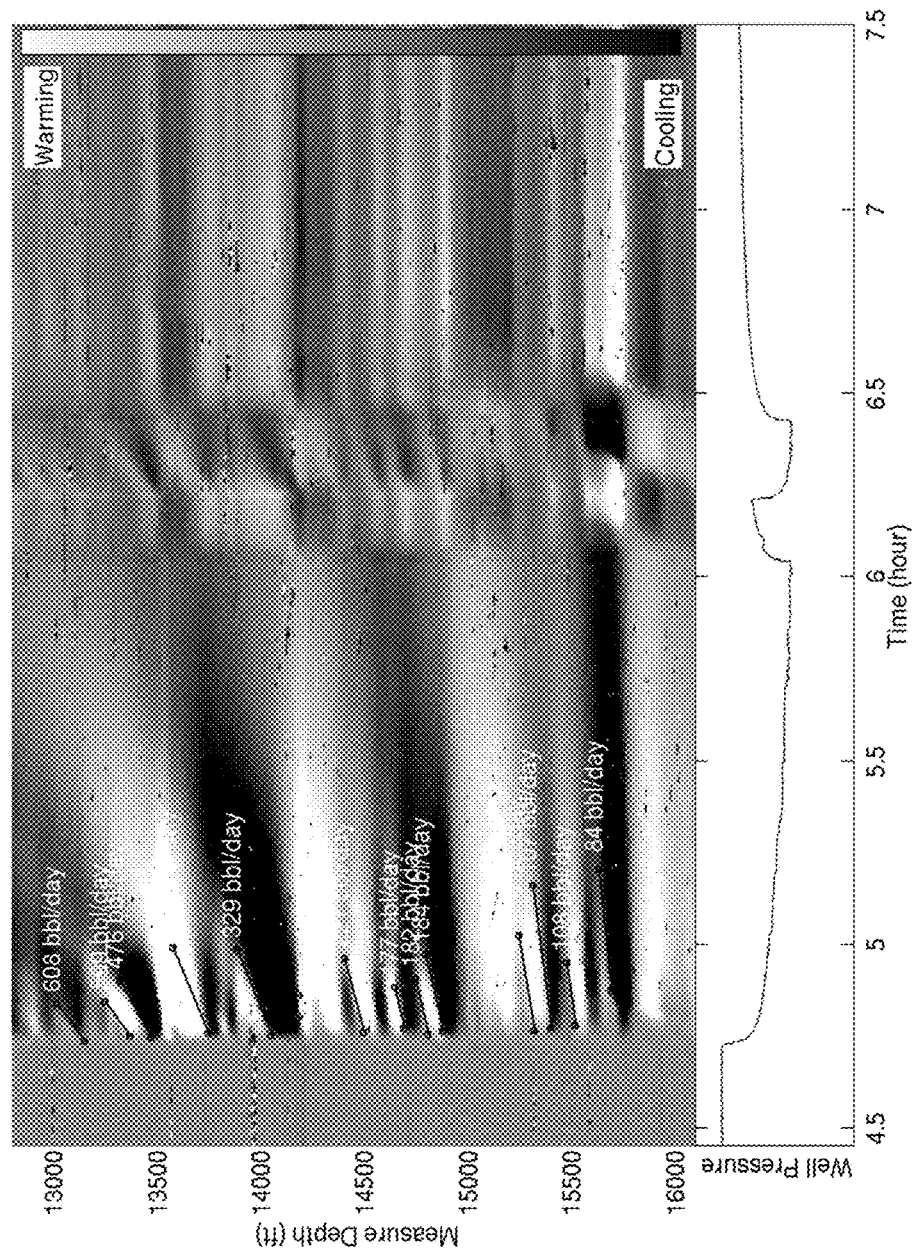
FIG. 2 demonstrates a typical DAS production log.

FIG. 2 shows a typical output of the DAS signal after filtering by a 50 mHz low-pass filter, slopes of the DAS contours are a measure of production rate, shown in barrels per day. Lighter colors indicate thermal expansion, while darker colors represent contraction. The vertical axis is the measured depth of the well in feet. The section of the well shown is horizontal. The horizontal axis is time in hours. The graph at the bottom of the figure represents downhole pressure in PSI.

Up until the time t=4.7 hours, the well had been shut in for 10 hours. The gray color is a neutral color, which indicates that the fluids in the well have reached thermal equilibrium with their surroundings and are neither cooling nor heating. This does not imply, however, that temperatures remain constant along the borehole, as evidenced by a DTS log (not shown). At t=4.7 hours, production was commenced at a constant rate of 630 Bbl/day, as evidenced by the sudden drop in downhole pressure at that time.

The signal shown in the low-frequency DAS record are caused by the temperature variation generated from the sudden movement of the fluid (having non-uniform temperature) within the well. A rough approximation of flow velocities may be obtained by drawing straight lines along the points where temperature variation is not constant (as shown), and measuring the slopes of these lines. These slopes may be interpreted as fluid velocities within the well. If this slope as a function of measured depth x is S(x) ft/hour, then the cumulative production rate of all well intervals from the toe of the well to depth x is given by S/A cu-ft/hour. Since there are 5.615 cubic feet in one barrel, this can be converted into 4.27 S/A barrels per day. These values are shown in FIG. 2, alongside their picked contour lines.

As indicated by the downhole pressure graph, shutting a well in causes significant pressure increases in the well. These pressure increases could conceivably change the production characteristics of the individual fractures, and give different production profiles that exist during steady-state production. To investigate this further, the shut-in experiment can be repeated with different shut-in times. After a 10 minute shut-in at t=6.05 hours, production was resumed at t=6.2 hours. The resulting production rates are similar but not identical to the rates after the 10 hour shut-in. The differences are probably within the margin of error.

Example 2

To obtain a more quantitative measure of fluid flow, we denote the temperature of the fluid inside the well at position x and time t as T(x, t). A detailed analysis of the heat flow of this problem shows that recorded DAS signal D(x, t), which is proportional to the time derivative of the temperature, is given by Equation 1:

$$\beta D = \frac{\partial T}{\partial t} = -v\frac{\partial T}{\partial x} + \frac{V_p}{A}(T_p - T) + \frac{K_c}{A}(T_f - T) + K_f \frac{\partial^2 T}{\partial x^2}$$

Where $\beta$ is the coefficient of proportionality between the DAS response and the time derivative of temperature. It is related to the thermal expansion coefficient of the glass fiber and the sensitivity of the DAS instrument. Knowing its value is not necessary to determine the flow rates.

The terms on the right side of this equation constitute, in order, the following contributions to the DAS response:

Fluid flow—When a fluid that has a non-uniform temperature distribution flows along a well, the temperature at a fixed point along that well will change at a rate given by to the velocity of the fluid times the spatial variability of the temperature.

Produced fluids—When produced fluid of temperature $T_p$ enters a well at a volume rate of $V_p$ per unit pipe length, and mixes with the existing fluid of the well having a temperature T, it will cause the temperature at that point in the well to change at a rate given by the difference in temperatures between the two fluids times $V_p/A$, where A is the cross-sectional area of the pipe.

Conduction—When a section of pipe having temperature T is encased in cement that is embedded into a formation that has temperature $T_f$, the resulting heat flow will cause the temperature in the well to change at a rate given by the difference between the two temperatures times a factor $K_c/A$, where $K_c$ is an effective thermal conduction coefficient, having units of area/time.

Diffusion—Fluids within the well will diffusively mix within it, causing the temperature to change at a rate given by the second spatial derivative of temperature times a fluid conductivity $K_f$. This conductivity also has units of area/time. Given the large ratio of pipe length to pipe diameter, this term is generally very small compared with the others, and will be neglected.

v(x) is the velocity of the fluid along the +x direction, which for the purposes of this paper is assumed to be held constant in time. Note that if x is the measured depth of the well, it will increase towards the toe of the well, while the fluid will flow in the opposite direction. Thus v(x) will be negative in this case.

The time rate of volume production per unit pipe length $V_p$ has units of volume/(length×time). This is related to the fluid velocity by Equation 2:

$$\frac{dv(x)}{x} = \frac{V_p(x)}{A}$$

Where $V_p(x)$ may be expressed as $r(x)P_0$, where $r(x)$ is the incremental production fraction per unit pipe length, as shown in Equation 3:

$$\int_{x_0}^{x_1} r(\xi)d\xi = 1$$

for $x_0$ being the coordinate of the heel of the well, and $x_1$ being the coordinate of the toe. $P_0$ is the bottom-hole total production rate (volume/time), which is presumed to not be a function of time. It can be back-calculated from the surface production rate, given certain properties of the fluids and the reservoir. From equations 2-3, it is clear that the cumulative fluid velocity at position x is given by Equation 4:

$$v(x) = \frac{P_0}{A}\int_{x_1}^{x} r(\xi)d\xi$$

As mentioned in the previously, interpretation of the DAS response by the multiple effects of Eq. (1). One way to eliminate some of these terms is to differentiate this equation with respect to time, since the formation and fluid temperatures, $T_f$ and $T_p$ do not vary with time. Ignoring the diffusion term, gives Equation 5:

$$\frac{\partial D}{\partial t} = -v\frac{\partial D}{\partial x} - D\left(\frac{\partial v}{\partial x} + \frac{K_c}{A}\right) = -\frac{\partial}{\partial x}(vD) - DK_c/A$$

This equation has a simplified approximate solution as:

$$D \approx f(-vt - x)e^{-\frac{K_c}{A}t} \quad \text{(Equation 6)}$$

With the assumption that $$\frac{dv}{dx}$$

is small. This solution indicates that a linear moveout should be observed in the data which is associated with the local flow rate v(x). However, in FIG. 2, the moveout of the DAS signal (the slope of constant temperature variation) do not increase monotonically. This is due to the thermal coupling condition between the sensing fiber and the wellbore fluid.

In this case, the optical fiber is installed behind the well casing and cemented in place, so the fiber is separated from the borehole fluid by a layer of metal and cement. This coupling effect can be estimated using a modified Theis equation. The borehole temperature T can be estimated from the measured fiber temperature $T_{fb}$ by:

$$T(\omega, x) = \frac{h(\omega, r)}{h(\omega, r_{fb})} T_{fb}(\omega, x) \quad \text{(equation 7)}$$

where r is the inner radius of the wellbore casing, $r_{fb}$ is the distance between the fiber and the center of the well. h is the Theis delta function response, which can be presented as:

$$h(t, r) = \frac{1}{4\pi ct} e^{-r^2/4ct} \quad \text{(equation 8)}$$

where c is the effective thermal diffusivity of the material (metal+cement) between the fiber and borehole fluid.

A similar method can be used to correct for thermal coupling effect for wireline or carbon rod based temporal fiber deployment, where fiber is inside the borehole but surrounded by cable material. In this case, $$T(\omega, x) = \frac{1}{g(\omega, r_c)} T_{fb}(\omega, x)$$

where $r_c$ is the radius of the cable g is the thermal response for the cable, which can be presented as:

$$T(t, r) = -\frac{2}{r}\frac{d}{dt}\sum_{n=1}^{\infty}\frac{e^{-ct\lambda_n^2}}{\lambda_n J_1(\lambda_n r)}$$

Where $\lambda_n$ is the nth root of Bessel function of first kind $J_0(\lambda_n D)=0$.

The thermal coupling effect can also be partially removed by simply taking the time-derivate of the data.

Figure 3B:
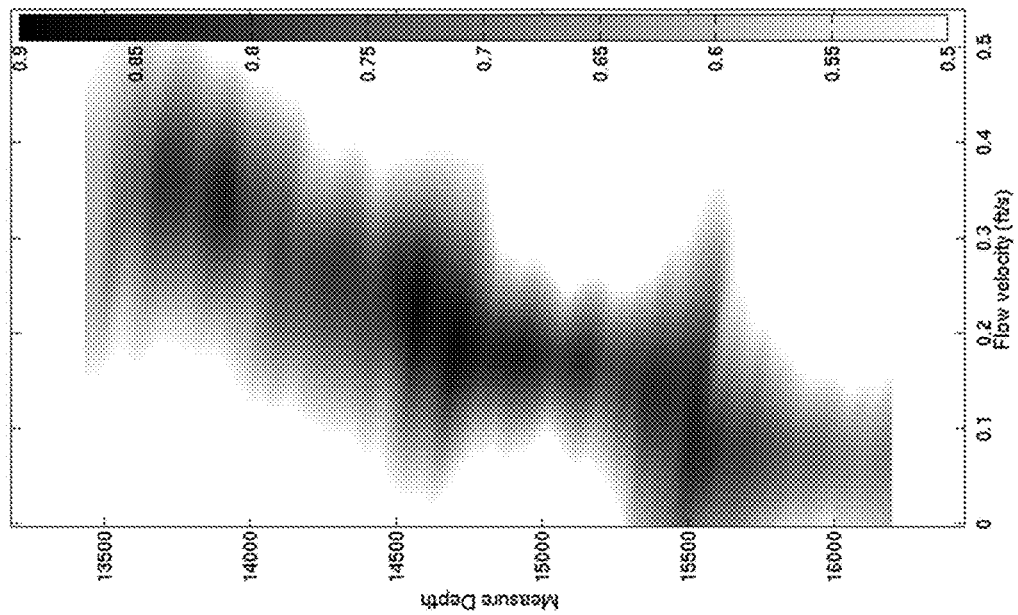
FIG. 3B shows the semblance function computed from Eq. (9)
Figure 3A:
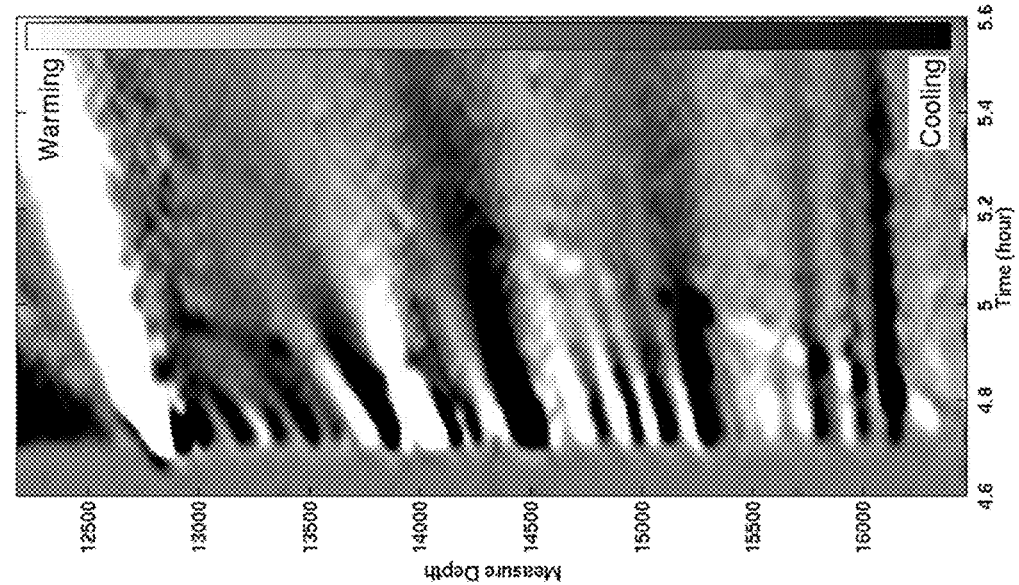
FIG. 3A shows one hour of DAS response during a well opening event in FIG. 2.

FIG. 3a shows a section of the DAS data of FIG. 2 after the thermal coupling effect removal. Although it is noisier than the original DAS signal due to the Eq. (7) boost up the high frequency content of the signal, it is much easier to interpret the flow velocity from. The "ripples" or events on this plot show that as time advances, the events move towards the heel of the well in a roughly constant velocity unique to that event. This in accordance with Eq. (6). The problem of measuring the velocity function v(x) of noisy events is well know in seismic data processing. One common method is to display a series of semblance functions of the data, each computed from M traces Di of DAS data after shifting each trace by a distance of $vt_i$, in Equation 9:

$$S(x, v) = \left[\left|\sum_i^M D_i(x-vt_i)\right|^2 - \sum_i^M \sum_t D_i^2(x-vt_i)\right] / \left[(N-1)\sum_i^M \sum_t D_i^2(x-vt_i)\right]$$

The semblance is a measure of the coherence of the velocity-corrected DAS measurement at the i-th time sample. It has a value ranging from 0 to 1, with 1 representing perfect correlation.

FIG. 3b shows the semblance function computed from Eq. (9), with darker colors representing higher values. The coherence of the differentiated DAS signal can be optimized by picking the velocities which maximize the semblance. These velocities may then be converted into cumulative flow rates via Eq. (2).

To further enhance the accuracy of the measurement, multiple shut-in/choke back and reopen of the monitored well could be scheduled during the data acquisition period. Each shut-in/reopen cycle can provide a velocity semblance measurement as shown in FIG. 3b. The optimized flow-velocity distribution measurement r(x) as in Eq. 3 can be estimated by maximizing the semblance value:

$$\max \sum_i S_i(x, P_i r(x))$$

Where $S_i$ is the semblance calculation for the $i^{th}$ shut-in/reopen cycle, $P_i$ is the total production rate (maximum flow velocity) for the $i^{th}$ shut-in/reopen cycle. $P_i$ can be either estimated from surface production data or jointly inverted with r(x).

Example 3

In order to improve resolution, a large time window may be used to conduct the analysis. In order to accommodate the larger time window, the linear relation between time and position (i.e. Eq. 7) cannot be assumed. Calculating the nonlinear relationship between time and position by solving Eq. 5 without assuming time is sufficiently small or that fluid temperature is sufficiently smooth. First define the new variable U(x,t)=v(x)D(x, t) and set $K_c$=0, Eq. (5) becomes Equation 9:

$$\frac{\partial U}{\partial t} + v(x)\frac{\partial U}{\partial x} = 0$$

Eq. 9 is a first-order, linear, homogenous, partial differential equation. Every solution of this equation must satisfy its characteristic Equation 10:

$$v(x) = -\frac{dx}{dt}$$

which is easily seen by substituting Eq. (10) into Eq. (9). Multiplying by dt and integrating, we obtain Equation 11:

$$t = -\int \frac{d\xi}{v(\xi)} + C = -\int s(\xi)d\xi + C$$

where $s(\xi)=1/v(\xi)$ is the fluid slowness function, which is the reciprocal of velocity.

The general analytic solution to Eq. (9) is Equation 12:

$$U(x,t)=F(C)=F[t+\int s(\xi)d\xi]$$

where F(τ) is any continuous function of time τ. However, we require a specific solution of Eq. (9) that also satisfies the initial condition $U(x,0)=U_0(x)$. This must satisfy Equation 13:

$$F[f(x)]=U_0(x)$$

where f(x) is the time required for fluid to flow from the heel of the well $x_0$ to some other position x. For production, this time is negative, whereas for injection (the opposite problem), the time is positive for $x>x_0$ as shown in Equation 14:

$$f(x)=\int_x^{x_0} s(\xi)d\xi$$

This implies Equation 15:

$$F(\tau)=U_0[f^{-1}(\tau)]$$

where $f^{-1}(\tau)$ is the inverse function of f(x). It represents the position of fluid at time τ that started to flow from position $x_0$ at time 0. The specific solution of Eq. (9) that satisfies the initial condition is Equation 16:

$$U(x,t)=U_0\{f^{-1}[t+f(x)]\}$$

Substituting u=vl), the final solution for the DAS response is Equation 17:

$$D(x,t)=D_0\{f^{-1}[t+f(x)]\}.$$

A non-trivial but useful special case of this solution occurs for uniform production along the well. This implies that the fluid velocity increases linearly in magnitude from the toe of the well (where it is 0) to the heel of the well, where it reaches a value of $v_0$ in Equation 18:

$$v(x) = \frac{x - x_1}{x_0 - x_1} v_0$$

This means that the traveltime function f(x) becomes for $x < x_1$ in Equation 19:

$$f(x) = s_0 \int_{x_0}^{x} \frac{x_0 - x_1}{\xi - x_1} d\xi = s_0(x_0 - x_1) \ln\left(\frac{x - x_1}{x_0 - x_1}\right)$$

where $s_0 = 1/v_0$. Its inverse is Equation 20:

$$f^{-1}(\tau) = (x_0 - x_1) \exp\left[\frac{\tau}{s_0(x_0 - x_1)}\right] + x_1$$

From Eq. (17), the DAS response for uniform production is Equation 21:

$$D(x, t) = D_0\left[(x - x_1) \exp\left(\frac{tv_0}{x_0 - x_1}\right) + x_1\right]$$

for the initial condition $D(x, 0) = D_0(x)$.

In one embodiment, this method would entail the following steps:
1. Using an initial best guess for the fluid velocities [perhaps Eq. (18)], compute the traveltime function f(x) from Eq. (14) or from Eq. (19) for the initial model.
2. Numerically form the inverse function f(−1) through piece-wise interpolation.
3. Form a series of trial traveltime functions $g(x,\delta\tau) = f(x) + \delta\tau$ and their inverses $g^{-1}(\tau) = f^{-1}(\tau - \delta\tau_i)$
4. Compute the semblance over a range of in Equation 22:

$$S(x, \delta\tau) = \frac{1}{M} \left|\sum_{i=1}^{M} D_i[g^{-1}(t_i + g(x))]\right|^2 \Big/ \sum_{i=1}^{M} D_i^2[g^{-1}(t_i + g(x))]$$

5. Set the new traveltime function f(x) to be the trial function $g(x,\delta\tau)$ yielding the maximum semblance.
6. Iterate back to Step 1 until convergence is achieved.

The principal advantage of this procedure is the fact that better resolution of $\delta\tau$'s can be achieved through sharper semblance peaks, since a greater range of times is used in the analysis.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

Example 4

Borehole temperature in the well reaches equilibrium after a period of stable production. By choking back the production rate on the surface, the borehole temperature is perturbed due to the flow rate change, which can be measured by low-frequency DAS. We can model the temperature perturbation by modifying the Eq. 1 as:

$$\frac{\partial \Delta T}{\partial t} = \alpha \frac{\partial (v \Delta T)}{\partial x} - k \Delta T + (1 - \alpha) k (T_f - T_0) \qquad \text{(Equation 23)}$$

Where $T_f(x)$ is the formation temperature that surrounded borehole, which can be measured during long shut-in period using DTS. $T_0(x)$ is the borehole temperature profile during stable production. $\Delta T = T - T_0$ is the temperature perturbation from the stable production temperature after choking back the production rate. $\alpha$ is the radio of the choking-back production rate to the stable production rate. This equation assumes the production allocation ratio along the well does not change with the total production rate during the data acquisition period.

Figure 4A:
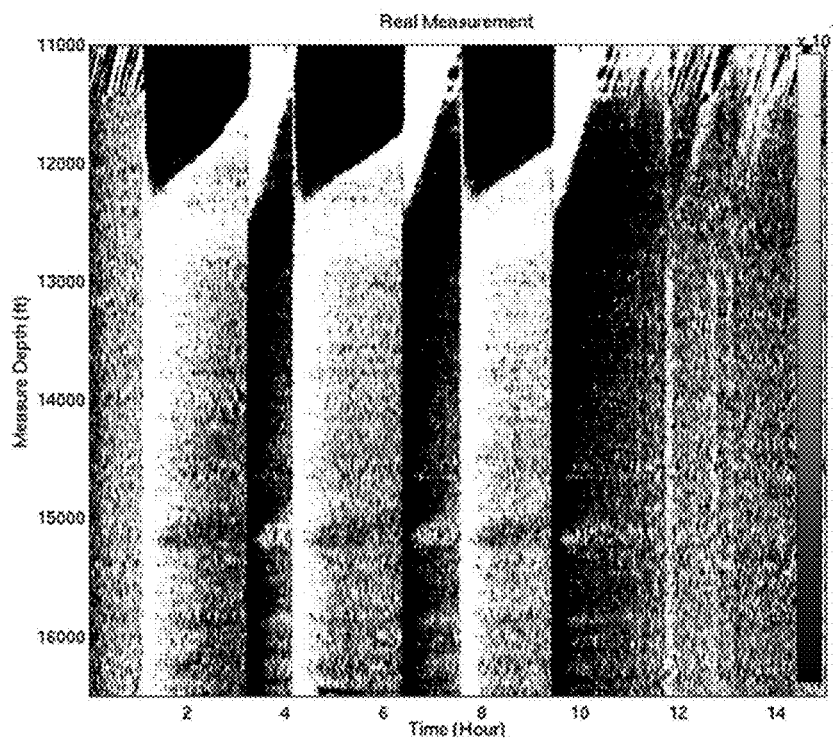
FIG. 4A shows the observed temperature perturbation during well choke-back and reopening sequence.
Figure 4B:
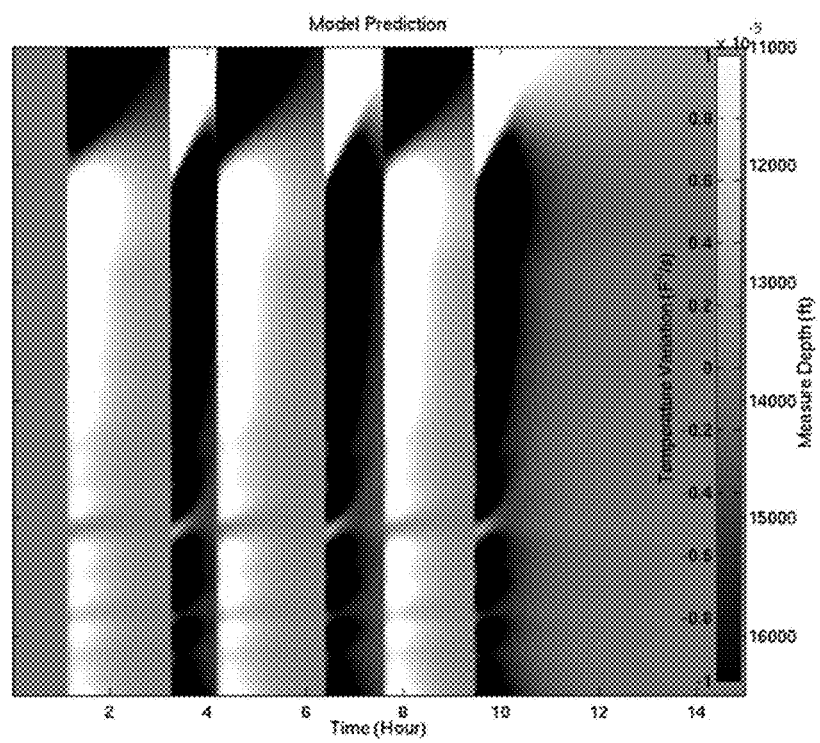
FIG. 4B shows the modeled temperature perturbation using Eq. (23).

FIG. 4(a) shows the temperature variation observed in a real horizontal well using low-frequency DAS. The well is stably producing in the beginning of the data acquisition. The production was choked back to 40% at the t=1.2, 4.1, and 7.5 hours, and resumed at t=3.2, 6.5, and 9.5 hours. The FIG. 4(b) shows a thermal model result calculated using Eq. 23. The flow velocity distribution v(x) can be estimated by minimizing the difference between the difference between the modeled and observed temperature variation.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Ser. No. 62/305,777 "Production Logs from distributed acoustic sensors".
2. U.S. Ser. No. 62/305,758 Low-Frequency Analysis of DAS Signals
3. Co-pending application "Identifying Frac Spatial Density With Temperature," filed Mar. 8, 2017
4. Co-pending application "Hydraulic fracture monitoring by low-frequency DAS," filed Mar. 8, 2017
5. Co-pending application "Temperature measurement by combining DAS/DTS data," filed Mar. 8, 2017
6. U.S. Pat. No. 6,778,720, "Dual slope fiber optic array interrogator," (2004).
7. U.S. Pat. No. 8,950,482, "Fracture monitoring," (2009).
8. US20060272809, "Wellbores utilizing fiber optic-based sensors and operating devices," (2006).
9. US20090114386, "Systems and methods for distributed interferometric acoustic monitoring," (2009).
10. US20130298635, "Techniques for Distributed Acoustic Sensing," (2013).

11. US20130298665, "System and method for monitoring strain & pressure," (2013).
12. US20130233537, "Fracture Characterisation," (2013).
13. US20140202240, "Flow Velocity and Acoustic Velocity Measurement with Distributed Acoustic Sensing," (2014).
14. US20140216151, "Flow Monitoring," (2014).
15. US20140260588, "Flow Sensing Fiber Optic Cable and System," (2014).
16. US20140358444, "Method of Hydraulic Fracture Identification Using Temperature," (2014).
17. US20160003032, "Matrix Temperature Production Logging Tool," (2016).
18. Boman, K., (2015), DAS technology expands fiber optic applications for oil, gas industry: Rigzone, May 4 issue.
19. Webster, P., et al., "Developments in Diagnostic Tools for Hydraulic Fracture Geometry Analysis," Unconventional Resources Technology Conference (URTeC), Denver, Colo., 12-14 Aug. 2013.
20. Optasense,"

The invention claimed is:
1. A method of monitoring oil flow rates along a hydrocarbon reservoir comprising:
    a) installing one or more fiber optic cables along a wellbore in a hydrocarbon formation;
    b) installing one or more interrogators on at least one of said fiber optic cables;
    c) interrogating at least one of said fiber optic cables with an interrogation signal during production;
    d) obtaining one or more datasets of data from at least one of said interrogators;
    e) converting one or more of said datasets from at least one of said interrogators into a continuous record;
    f) transforming the continuous record with a low-pass filter to 1-100 milliHz while down sampling the data into a transformed well signal;
    g) approximating flow velocities at a given depth by calculating the slope of temperature variation as a function of depth from the transformed well signal; and
    h) estimating from the slope of temperature variation as a function of depth a cumulative production rate of hydrocarbons from said hydrocarbon formation.

2. The method of claim 1, further including the step of using said transformed well signal, temperature variation, or cumulative production rate in a reservoir modeling program to predict one or more reservoir performance characteristics including fracturing, production rates, total production levels, rock failures, faults, or wellbore failure.

3. The method of claim 1, further including the step of using said transformed well signal, temperature variation, or cumulative production rate to design and implement a hydraulic fracturing program, any enhanced oil recovery program, or a production plan.

4. The method of claim 1, including the further step of printing, displaying or saving the transformed well signal, temperature variation, or cumulative production rate.

5. A non-transitory machine-readable storage medium, which when executed by at least one processor of a computer, performs the steps of claim 1.

6. A method of monitoring oil flow rates along a hydrocarbon reservoir comprising:
    a) installing one or more fiber optic cables along a wellbore in a hydrocarbon formation;
    b) installing one or more interrogators on at least one of said fiber optic cables;
    c) interrogating at least one of said fiber optic cables with an interrogation signal during production;
    d) obtaining one or more datasets of data from at least one of said interrogators;
    e) converting one or more of said datasets from at least one of said interrogators into a continuous record;
    f) transforming the continuous record with a low-pass filter to 1-100 milliHz while down sampling the data into a transformed well signal;
    g) quantitatively measuring flow velocities by removing the effect of constant-temperature produced fluids from the transformed well signal to generate a differentiated distributed acoustic sensing (DAS) signal;
    h) computing a semblance function for the differentiated DAS signal; and
    i) determining from the semblance function for the differentiated DAS signal a cumulative production rate of hydrocarbons from said hydrocarbon formation.

7. The method of claim 6, further including the step of using said transformed well signal, differentiated DAS signal, semblance function, or cumulative production rate in a reservoir modeling program to predict one or more reservoir performance characteristics including fracturing, production rates, total production levels, rock failures, faults, or wellbore failure.

8. The method of claim 6, further including the step of using said transformed well signal, semblance function, differentiated DAS signal, or cumulative production rate to design and implement a hydraulic fracturing program, any enhanced oil recovery program, or a production plan.

9. The method of claim 6, including the further step of printing, displaying or saving the transformed well signal, semblance function, differentiated DAS signal, or cumulative production rate.

10. A non-transitory machine-readable storage medium, which when executed by at least one processor of a computer, performs the steps of claim 6.

11. A method of monitoring oil flow rates along a hydrocarbon reservoir comprising:
    a) installing one or more fiber optic cables along a wellbore in a hydrocarbon formation;
    b) installing one or more interrogators on at least one of said fiber optic cables;
    c) interrogating at least one of said fiber optic cables with an interrogation signal during production;
    d) obtaining one or more datasets of data from at least one of said interrogators;
    e) converting one or more of said datasets from at least one of said interrogators into a continuous record;
    f) transforming the continuous record with a low-pass filter to 1-100 milliHz while down sampling the data into a transformed well signal;
    g) quantitatively measuring flow velocities from the transformed well signal comprising:
        i) use and initial estimate of fluid velocity to compute a traveltime function f(x),
        ii) numerically form an inverse function through piecewise interpolation,
        iii) form a series of traveltime functions and their inverses,
        iv) compute a semblance over a range of changes in time ($\delta\tau$),
        v) set a new traveltime function f(x) at a trial function g(x, $\delta\tau$), and
        vi) repeat (i)-(v) until convergence is achieved; and
    h) determining from the measured flow velocities a cumulative production rate of hydrocarbons from said hydrocarbon formation.

12. The method of claim 11, further including the step of using said transformed well signal, semblance function, traveltime function, or cumulative production rate in a reservoir modeling program to predict one or more reservoir performance characteristics including fracturing, production rates, total production levels, rock failures, faults, or wellbore failure.

13. The method of claim 11, further including the step of using said transformed well signal, semblance function, traveltime function, or cumulative production rate to design and implement a hydraulic fracturing program, any enhanced oil recovery program, or a production plan.

14. The method of claim 11, including the further step of printing, displaying or saving the transformed well signal, semblance function, traveltime function, or cumulative production rate.

15. A non-transitory machine-readable storage medium, which when executed by at least one processor of a computer, performs the steps of claim 11.

\* \* \* \* \*